US012770773B2

(12) United States Patent
Hawley et al.

(10) Patent No.: US 12,770,773 B2
(45) Date of Patent: Oct. 20, 2026

(54) LOW PROFILE COUPLED INDUCTOR

(71) Applicant: Analog Devices, Inc., Wilmington, MA (US)

(72) Inventors: Steve Hawley, Emerald Hills, CA (US); George Anthony Serpa, San Jose, CA (US); John Brazzle, Tracy, CA (US); Jim Yang, Sunnyvale, CA (US)

(73) Assignee: Analog Devices, Inc., Wilmington, MA (US)

( * ) Notice: Subject to any disclaimer, the term of this patent is extended or adjusted under 35 U.S.C. 154(b) by 1084 days.

(21) Appl. No.: 17/723,260

(22) Filed: Apr. 18, 2022

(65) Prior Publication Data

US 2023/0335328 A1 Oct. 19, 2023

(51) Int. Cl.
*H01F 27/26* (2006.01)
*H01F 41/02* (2006.01)

(52) U.S. Cl.
CPC ......... *H01F 27/26* (2013.01); *H01F 41/0206* (2013.01)

(58) Field of Classification Search
CPC ........ H01F 27/26; H01F 41/0206; H01F 3/14; H01F 27/2847; H01F 27/263; H01F 27/027; H01F 27/266; H01F 27/29; H01F 27/34; H01F 41/02; H02M 3/00
USPC .................... 336/65, 83, 178, 200, 212, 232
See application file for complete search history.

(56) References Cited

U.S. PATENT DOCUMENTS 4,801,912 A 1/1989 McElheny et al.
4,841,101 A 6/1989 Pollock
5,223,672 A 6/1993 Pinneo et al.
5,432,482 A 7/1995 Bailey
5,523,622 A 6/1996 Harada et al.
5,760,650 A 6/1998 Faulkner et al.
5,783,870 A 7/1998 Mostafazadeh et al.
5,790,005 A 8/1998 Santi et al.
(Continued)

FOREIGN PATENT DOCUMENTS

CN 106787905 A 5/2017
DE 202014104574 11/2014
(Continued)

OTHER PUBLICATIONS

Alléaume et al., "Millimetre-wave hot-via interconnect-based GaAs chip-set for automotive RADAR and security sensors," Proceedings of the 3rd European Microwave Integrated Circuits Conference, Oct. 2008, Amsterdam, The Netherlands, pp. 52-55.
(Continued)

*Primary Examiner* — Tuyen T Nguyen
(74) *Attorney, Agent, or Firm* — Knobbe, Martens, Olson & Bear, LLP

(57) ABSTRACT

A low-profile coupled inductor is disclosed to provide compact and high performance magnetic coupling. The low-profile coupled inductor has an asymmetrical geometry, having a pair of complementary ferrite cores supporting a pair of conducting strips in an alternating serpentine pattern. One or more core gaps exist between the cores to create a strong flux coupling between adjacent magnetic fields of either conducting strip. The alternating serpentine conductors and core gaps serve to increase energy transfer between the magnetic fields and improve the overall power density of the low-profile coupled inductor.

16 Claims, 4 Drawing Sheets

(56) References Cited

U.S. PATENT DOCUMENTS

| | | | | |
|---|---|---|---|---|
| 5,819,401 | A | 10/1998 | Johannes et al. | |
| 5,932,927 | A | 8/1999 | Koizumi et al. | |
| 5,994,975 | A | 11/1999 | Allen et al. | |
| 6,008,530 | A | 12/1999 | Kano | |
| 6,111,198 | A | 8/2000 | Tower | |
| 6,415,504 | B1 | 7/2002 | Matsuda | |
| 6,423,575 | B1 | 7/2002 | Tran et al. | |
| 6,455,880 | B1 | 9/2002 | Ono et al. | |
| 6,514,783 | B1 | 2/2003 | Welstand | |
| 6,680,544 | B2 | 1/2004 | Lu et al. | |
| 6,841,731 | B1 | 1/2005 | Zanello | |
| 6,844,502 | B2 | 1/2005 | Deng et al. | |
| 6,900,533 | B2 | 5/2005 | Burton | |
| 7,045,386 | B2 | 5/2006 | Hikita et al. | |
| 7,412,172 | B2 | 8/2008 | Kuchta et al. | |
| 7,444,734 | B2 | 11/2008 | Gaucher et al. | |
| 7,528,475 | B2 | 5/2009 | Go et al. | |
| 7,569,918 | B2 | 8/2009 | Gerber et al. | |
| 7,642,635 | B2 | 1/2010 | Kikuchi et al. | |
| 7,732,913 | B2 | 6/2010 | Hsieh et al. | |
| 7,968,978 | B2 | 6/2011 | Adlerstein et al. | |
| 7,994,622 | B2 | 8/2011 | Mohammed et al. | |
| 8,119,931 | B1 | 2/2012 | Liu | |
| 8,153,449 | B2 | 4/2012 | Adlerstein et al. | |
| 8,487,604 | B2 | 7/2013 | Ikriannikov et al. | |
| 8,618,629 | B2 | 12/2013 | Kim et al. | |
| 8,623,700 | B1 | 1/2014 | Bernstein et al. | |
| 8,638,187 | B2 | 1/2014 | Ikriannikov | |
| 8,773,204 | B2 | 7/2014 | Cabanillas et al. | |
| 8,779,885 | B2 | 7/2014 | Li et al. | |
| 9,048,232 | B2 | 6/2015 | Colussi et al. | |
| 9,059,490 | B2 | 6/2015 | DeVries et al. | |
| 9,184,117 | B2 | 11/2015 | Ho et al. | |
| 9,245,835 | B1 | 1/2016 | Jiang et al. | |
| 9,252,665 | B2 | 2/2016 | Hashino et al. | |
| 9,318,450 | B1 | 4/2016 | Reza et al. | |
| 9,437,558 | B2 | 9/2016 | Pye et al. | |
| 9,559,043 | B2 | 1/2017 | Ye | |
| 9,577,416 | B2 | 2/2017 | Nisslbeck et al. | |
| 9,666,544 | B2 | 5/2017 | Zu et al. | |
| 9,711,465 | B2 | 7/2017 | Liao et al. | |
| 9,812,379 | B1 | 11/2017 | Chiu et al. | |
| 9,978,698 | B1 | 5/2018 | Trulli et al. | |
| 10,325,715 | B2 | 6/2019 | Knoll et al. | |
| 10,325,742 | B2 | 6/2019 | Koul et al. | |
| 10,665,579 | B2 | 5/2020 | Trimberger et al. | |
| 10,872,816 | B2 | 12/2020 | Hollis | |
| 10,945,337 | B2 | 3/2021 | Ikeda et al. | |
| 10,958,182 | B2 | 3/2021 | Ji et al. | |
| 11,017,937 | B2 | 5/2021 | Hsieh et al. | |
| 11,049,638 | B2 | 6/2021 | Hanson et al. | |
| 11,350,537 | B2 | 5/2022 | Winter et al. | |
| 11,417,615 | B2 | 8/2022 | Lin | |
| 11,424,196 | B2 | 8/2022 | Mahon et al. | |
| 11,721,472 | B2 * | 8/2023 | Zheng | H01F 3/14<br>336/5 |
| 2002/0089069 | A1 | 7/2002 | Lamson et al. | |
| 2003/0053286 | A1 | 3/2003 | Masuda et al. | |
| 2003/0080822 | A1 | 5/2003 | Tzsuang et al. | |
| 2004/0173370 | A1 | 9/2004 | Deng et al. | |
| 2004/0227583 | A1 | 11/2004 | Shaffner et al. | |
| 2008/0023814 | A1 | 1/2008 | Yang | |
| 2008/0100394 | A1 | 5/2008 | Margomenos et al. | |
| 2009/0057872 | A1 | 3/2009 | Ehlers et al. | |
| 2009/0102740 | A1 | 4/2009 | Rofougaran | |
| 2010/0007457 | A1 | 1/2010 | Yan et al. | |
| 2010/0200968 | A1 | 8/2010 | Purden et al. | |
| 2010/0232480 | A1 | 9/2010 | Bhandal et al. | |
| 2010/0321129 | A1 | 12/2010 | Onody et al. | |
| 2011/0084358 | A1 | 4/2011 | Kim et al. | |
| 2011/0223692 | A1 | 9/2011 | Adlerstein et al. | |
| 2011/0228507 | A1 | 9/2011 | Yin et al. | |
| 2012/0049994 | A1 | 3/2012 | Joo et al. | |
| 2012/0062332 | A1 | 3/2012 | Nagai et al. | |
| 2012/0193771 | A1 | 8/2012 | Masuda | |
| 2013/0015467 | A1 | 1/2013 | Krumbein et al. | |
| 2013/0256849 | A1 | 10/2013 | Danny et al. | |
| 2013/0256850 | A1 | 10/2013 | Danny et al. | |
| 2014/0118084 | A1 | 5/2014 | Takemura | |
| 2014/0251670 | A1 | 9/2014 | Sakai et al. | |
| 2014/0300003 | A1 | 10/2014 | Kariyazaki et al. | |
| 2015/0042417 | A1 | 2/2015 | Onodera et al. | |
| 2015/0097633 | A1 | 4/2015 | DeVries et al. | |
| 2015/0255360 | A1 | 9/2015 | Hsu | |
| 2016/0064792 | A1 | 3/2016 | Qiang et al. | |
| 2016/0088754 | A1 | 3/2016 | Francis | |
| 2016/0124478 | A1 | 5/2016 | Beeston et al. | |
| 2016/0126920 | A1 | 5/2016 | Kaper | |
| 2016/0181211 | A1 | 6/2016 | Kamgaing et al. | |
| 2016/0343653 | A1 | 11/2016 | Huang et al. | |
| 2016/0344084 | A1 | 11/2016 | Ghassemi et al. | |
| 2017/0048969 | A1 | 2/2017 | Qiang et al. | |
| 2017/0077896 | A1 | 3/2017 | Sugaya et al. | |
| 2017/0111078 | A1 | 4/2017 | Onodera et al. | |
| 2017/0179050 | A1 | 6/2017 | Kariyazaki | |
| 2017/0236803 | A1 | 8/2017 | Zaal | |
| 2017/0268827 | A1 | 9/2017 | Kaminski et al. | |
| 2017/0330678 | A1 * | 11/2017 | Harrison | H01F 3/10 |
| 2017/0345541 | A1 | 11/2017 | Yang et al. | |
| 2018/0012834 | A1 | 1/2018 | Wang et al. | |
| 2018/0034421 | A1 | 2/2018 | Abdo et al. | |
| 2018/0122747 | A1 | 5/2018 | Sun et al. | |
| 2018/0358675 | A1 | 12/2018 | Laighton et al. | |
| 2019/0267361 | A1 | 8/2019 | Rahim et al. | |
| 2019/0295966 | A1 | 9/2019 | Kong | |
| 2019/0333899 | A1 | 10/2019 | Eom et al. | |
| 2019/0371746 | A1 | 12/2019 | Mahon et al. | |
| 2019/0371747 | A1 | 12/2019 | Wilcox | |
| 2020/0075490 | A1 | 3/2020 | Sung et al. | |
| 2020/0168567 | A1 | 5/2020 | Lin | |
| 2020/0212914 | A1 | 7/2020 | Lee et al. | |
| 2020/0375049 | A1 | 11/2020 | Winter et al. | |
| 2022/0255249 | A1 | 8/2022 | Kikuta | |
| 2022/0293334 | A1 * | 9/2022 | Jin | H01F 3/14 |

FOREIGN PATENT DOCUMENTS

| | | | |
|---|---|---|---|
| JP | 59-155154 | | 9/1984 |
| JP | 2010267816 | A | 11/2010 |
| KR | 10-2006-0015919 | | 2/2006 |

OTHER PUBLICATIONS

Bessemoulin et al., "A chip-scale packaged amplifier MMIC using broadband hot-via-transitions," 11th GAAS Symposium, Munich 2003, pp. 415-418.

Bessemoulin, "Design data for hot-via interconnects in chip scale packaged MMICs up to 110 GHz," 12th GAAS Symposium, Amsterdam 2004, pp. 495-498.

Bessemoulin et al., "Hot-via interconnects: A step toward surface mount chip scale packaged MMICs up to 110 GHz," IEEE CSIC Digest, 2004, pp. 237-240.

Bessemoulin et al., "Soldered hot-via E-band and W-band power amplifier MMICs for millimeter-wave chip scale packaging," IEEE, 2016, pp. 1-4.

Kazior et al., "DBIT—Direct Backside Interconnect Technology: A manufacturable, bond wire free interconnect technology for microwave and millimeter wave MMICs," IEEE MTT-S Digest, 1997, pp. 723-726.

Lin et al., "6 inch 0.1 um GaAs pHEMT technology for E/V/ band application," CS MANTECH Conference, May 16-19, 2011, Palm Springs, CA, pp. 1-3.

Lin et al., "Development of an ultra-wideband suspended stripline to shielded microstrip transition," IEEE Microwave and Wireless Components Letters, Sep. 2011, vol. 21, No. 9. pp. 474-476.

Schmückle et al., "40 GHz hot-via flip-chip interconnects," IEEE MTT-S Digest, 2003, pp. 1167-1170.

Stratix 10 Devices, High Speed Signal Interface Layout Design Guideline, Intel, pp. 1-88, Nov. 11, 2016.

Zhou et al., "3D heterogeneous integration technology using hot via MMIC and silicon interposer with millimeter wave application," IEEE, 2017, pp. 499-502.

(56) References Cited

OTHER PUBLICATIONS

Extended European Search Report issued in application No. 19176598.1, dated Oct. 4, 2019.
Dang, Zhigang et al., "Permanent Magnet Coupled Power Inductor for Multi-Phase DC-DC Power Converters", IEEE Transactions on Industrial Electronics 2016, DOI: 10.1109/TIE.2016.2626364, in 10 pages.
Office Action for DE 10 2023 108 460.7, issued Feb. 28, 2026.

* cited by examiner

LOW PROFILE COUPLED INDUCTOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention generally relates to electrical inductors, particularly a low-profile coupled inductor.

Description of the Related Art

In multi-phase DC-DC converters, particularly mechanically constrained micro module DC-DC converters, there is a need for higher operating efficiency and improved transient load response. However, DC-DC converters utilizing a conventional coupled inductor to perform the voltage conversion are limited by the size and performance of existing options. An improved low-profile multi-phase coupled inductor with higher power density is sought to enhance the performance of these DC-DC converters.

SUMMARY OF THE INVENTION

A low-profile coupled inductor is disclosed to provide compact and high performance magnetic coupling. The low-profile coupled inductor has an asymmetrical geometry, having a pair of complementary ferrite cores supporting a pair of conducting strips in an alternating serpentine pattern. One or more core gaps exist between the cores to create a strong flux coupling between adjacent magnetic fields of either conducting strip. The alternating serpentine conductors and core gaps serve to increase energy transfer between the magnetic fields and improve the overall power density of the low-profile coupled inductor.

In one aspect, a low-profile coupled inductor includes a first core having a first inner surface and a serpentine channel on the first inner surface formed by a plurality of projections, a second core having a second inner surface and a serpentine channel on the second inner surface formed by plurality of projections, first and second conducting strips, each of the first and second conducting strips having an inlet port and an outlet port, wherein the first conducting strip is disposed in the serpentine channel of the first core and the second conducting strip is disposed in the serpentine channel of the second core, and wherein each of the first and second conducting strips is disposed between the plurality of projections such that at least a portion of the first conducting strip that extends parallel to the second conducting strip is not coplanar with the second conducting strip.

In another aspect, a low-profile coupled inductor includes at least one ferrite core, a plurality of parallel projections extending from the ferrite core, first and second conducting strips, each of the first and second conducting strips having an inlet port and an outlet port, wherein each of the first and second conducting strips is disposed between the parallel projections such that at least a portion of the first conducting strip that extends parallel to the second conducting strip is not coplanar with the second conducting strip, and wherein the first and second conducting strips are configured such that both of the inlet ports of the first and second conducting strips are adjacent and both of the outlet ports of the first and second conducting strips are adjacent.

In yet another aspect, a method of manufacturing a low-profile coupled inductor includes providing a first core having a first inner surface and a serpentine channel on the first inner surface formed by a plurality of projections, providing a second core having a second inner surface and a serpentine channel on the second inner surface formed by plurality of projections, forming a first and a second conducting strip, each one of the first and second conducting strips having an inlet port and an outlet port, inserting the first conducting strip into the corresponding serpentine channel in the first core and inserting the second conducting strip into the corresponding serpentine channel in the second core, and mechanically connecting the first core and the second core together by at least two of the projections such that both of the inlet ports of the first and second conducting strips are adjacent and both of the outlet ports of the first and second conducting strips are adjacent.

DETAILED DESCRIPTION OF THE PREFERRED EMBODIMENT

Figure 1:
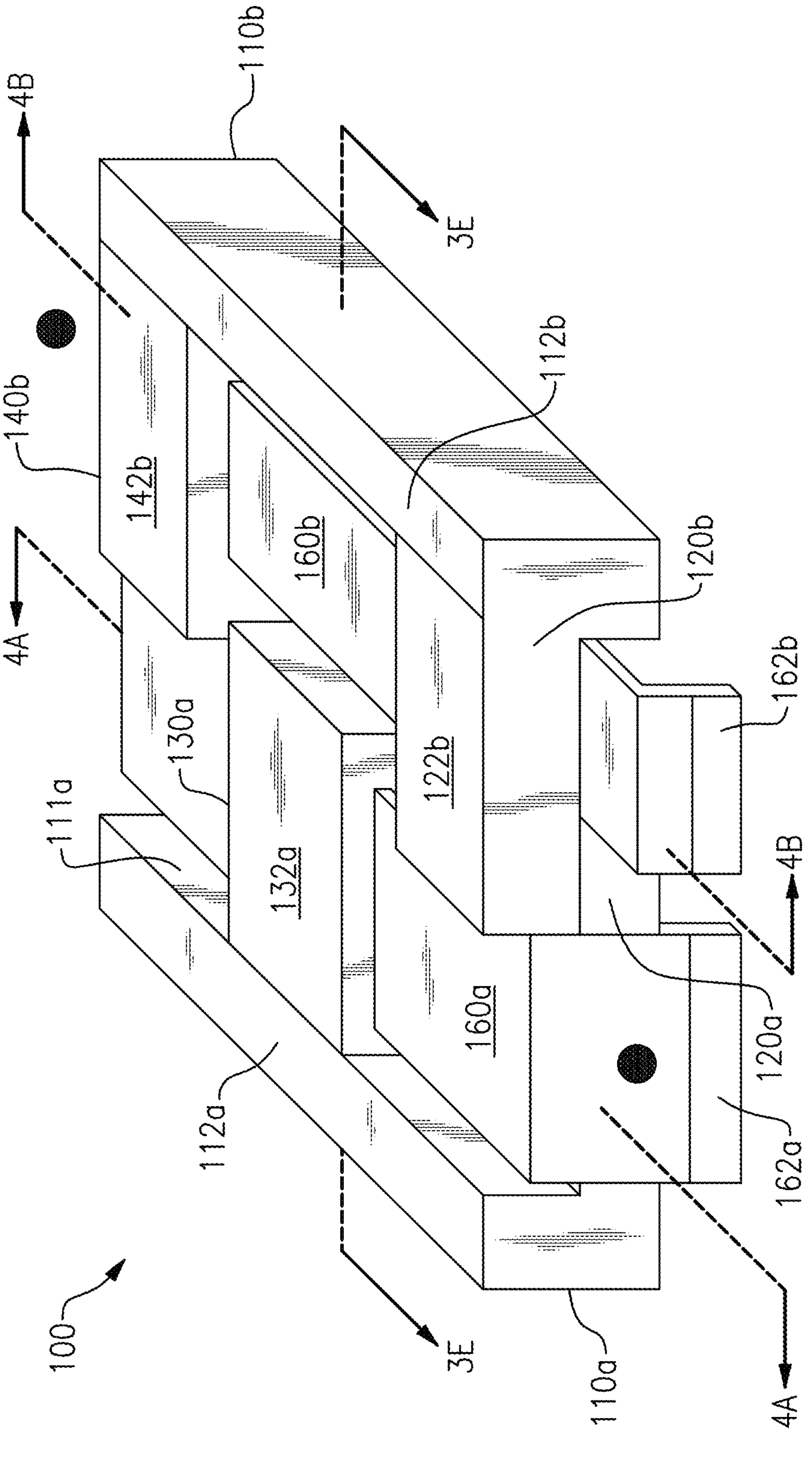
FIG. 1 is an orthographic projection of a low-profile coupled inductor constructed according to the present invention.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A low-profile coupled inductor constructed according to the present invention provides compact and high performance magnetic coupling while avoiding harmful electromagnetic interference (EMI) that can result from unshielded magnetic fields. The low-profile coupled inductor has an asymmetrical coupled inductor geometry, with a pair of ferrite cores supporting a pair of conducting strips in an alternating serpentine pattern. One or more core gaps exist between the cores to create a strong flux coupling between adjacent magnetic fields of the conducting strips. The alternating serpentine conductors and core gaps improve the overall power density of the low-profile coupled inductor. The inductor has horizontally oriented legs to mount inside a micro module package, on a substrate, or in another constrained space. The coupled inductor has effectively the same performance as two conventional inductors while occupying half the surface area when mounted to a printed circuit board (PCB).

Embodiments of the Low-Profile Coupled Inductor

Figure 2:
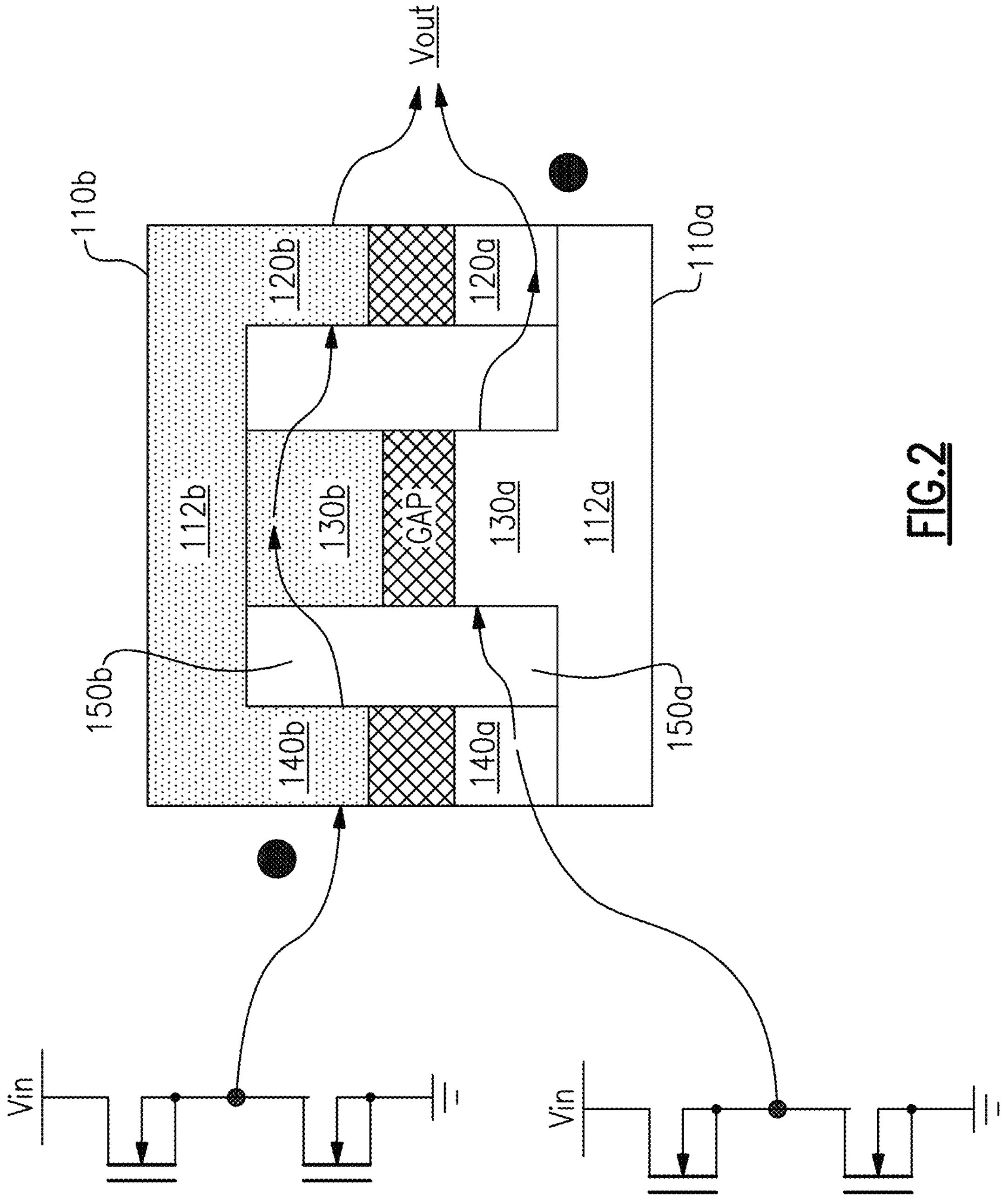
FIG. 2 is a top plan view of the low-profile coupled inductor illustrating interlocking first and second cores.

Referring initially to FIG. 1 and FIG. 2, a low profile coupled inductor is shown generally by 100. The inductor 100 includes a first core 110*a* and a second core 110*b*, each one of the cores 110*a/b* having a plurality of projections extending from an inner surface 111*a/b* of the core. In the embodiment of FIG. 1 and FIG. 2, each core 110*a/b* has a first projection 120*a/b*, a second projection 130*a/b*, and a third projection 140*a/b* extending from the inner surface 111*a/b* of the core. (The projections 130*b* and 140*a* are obscured from view in FIG. 1.) As will be understood by one skilled in the art, embodiments of the inductor 100 can be constructed having more than three projections extending from each core.

In the preferred embodiment of the present invention, the cores 110*a/b* including the projections 120*a*-140*b* can be formed of a ferrite ceramic (such as manganese-zinc ferrite having the formula $Mn_aZn_{(1-a)}Fe_2O_4$, or nickel-zinc ferrite having the formula $Ni_aZn_{(1-a)}Fe_2O_4$), but can be constructed of any material known to one skilled in the art.

Each of the first projections 120*a/b*, second projections 130*a/b*, and third projections 140*a/b* can have a substantially rectangular footprint where the projection interfaces with one of the cores 110*a/b*. Each core has a substantially rectangular upper surface 112*a/b* and lower surface 113*a/b*. As will be discussed in more detail herein, the upper and lower surfaces 112*a*-113*b* can be parallel planes that outline a substantially rectangular profile of the core 110*a/b*.

The positioning of the first, second, and third projections 120*a*-140*b* can alternate in elevation along the inner surface 111*a/b*. For example, the first projection 120*a* and the third projection 140*a* can each be connected to the inner surface 111*a* of the first core 110*a* such that a lower surface 121*a*/141*a* of the projection is substantially level with the lower surface 113*a* of the core. The second projection 130*a* can connect to the inner surface 111*a* such that an upper surface 132*a* of the projection is substantially level with the upper surface 112*a* of the core. In embodiments of the inductor 100 with more than three projections connected to each core 110*a/b*, adjacent projections alternate between being level with the upper surface 112*a/b* and the lower surface 113*a/b*.

The alternating projections 120*a*, 130*a*, and 140*a* form a first serpentine channel 150*a* along the inner surface 111*a* of the first core 110*a*. The alternating projections 120*b*, 130*b*, and 140*b* form a second serpentine channel 150*b* along the inner surface 111*b* of the second core 110*b*. The first serpentine channel 150*a* is configured to receive a first conducting strip 160*a* within the first core 110*a*, and the second serpentine channel 150*b* is configured to receive a second conducting strip 160*b* within the second core 110*b*. Each of the first and second conducting strips 160*a/b* is disposed within its respective serpentine channel 150*a/b* such that at least a portion of the first conducting strip that extends parallel to the second conducting strip is not coplanar with the second conducting strip. Due to the alternating pattern of the serpentine channels 150*a/b*, adjacent portions of each of the first and second conducting strips 160*a/b* can be positioned within the inductor 100 at opposite elevations to enhance magnetic coupling between the conducting strips. For example, in FIG. 1, a rectangular portion of the first conducting strip 160*a* located above the first core projection 120*a* is magnetically coupled to a corresponding rectangular portion of the second conducting strip 160*b* located below the second core projection 120*b*. Although certain portions of both conducting strips 160*a/b* can be coplanar (for example, the vertical portions in FIGS. 3B and 3C), maintaining portions of the conducting strips in separate planes improves the magnetic coupling of the inductor 100.

Each conducting strip 160*a/b* has an input terminal 161*a/b* and an output terminal 162*a/b* located at opposite ends of the strip 160*a/b*. The four terminals 161*a/b* and 162*a/b* are provided to connect the low-profile coupled inductor 100 to additional circuit elements, and can be molded, electro-plated, or otherwise conditioned to easily integrate with an electronic circuit. For easier integration of the input terminals 161*a/b* and output terminals 162*a/b* into an electronic circuit (such as, by routing printed circuit board traces), the conducting strips 160*a/b* can be inserted into the cores such that when assembled, both input terminals 161*a/b* are positioned at one end of the inductor 100, and both output terminals 162*a/b* are positioned at an opposite end of the inductor.

The conducting strips 160*a/b* can be copper or copper alloy. In certain embodiments, the composition of each of the conducting strips 160*a/b* is at least 20% copper. In other embodiments, the conducting strips can be at least partially gold, silver, aluminum, zinc, or any other conductor known to one skilled in the art.

When the conducting strips 160*a/b* are installed in either core 110*a/b*, an end portion of each of the first core projections 120*a*, 130*a*, and 140*a* is provided to connect to a complementary end portion of each of the second core projections 120*b*, 130*b*, and 140*b* respectively. The complementary end portions fasten the first core 110*a* and the second core 110*b* together, as illustrated in FIG. 1. Due to the alternating paths of the serpentine channels 150*a/b*, the conducting strips 160*a/b* are adjacent inside the inductor 100 but in substantially different planes to achieve strong magnetic coupling when a current is passed through either of the conducting strips.

Figures 3A, 3B, 3C, 3D, 3E, 3F:
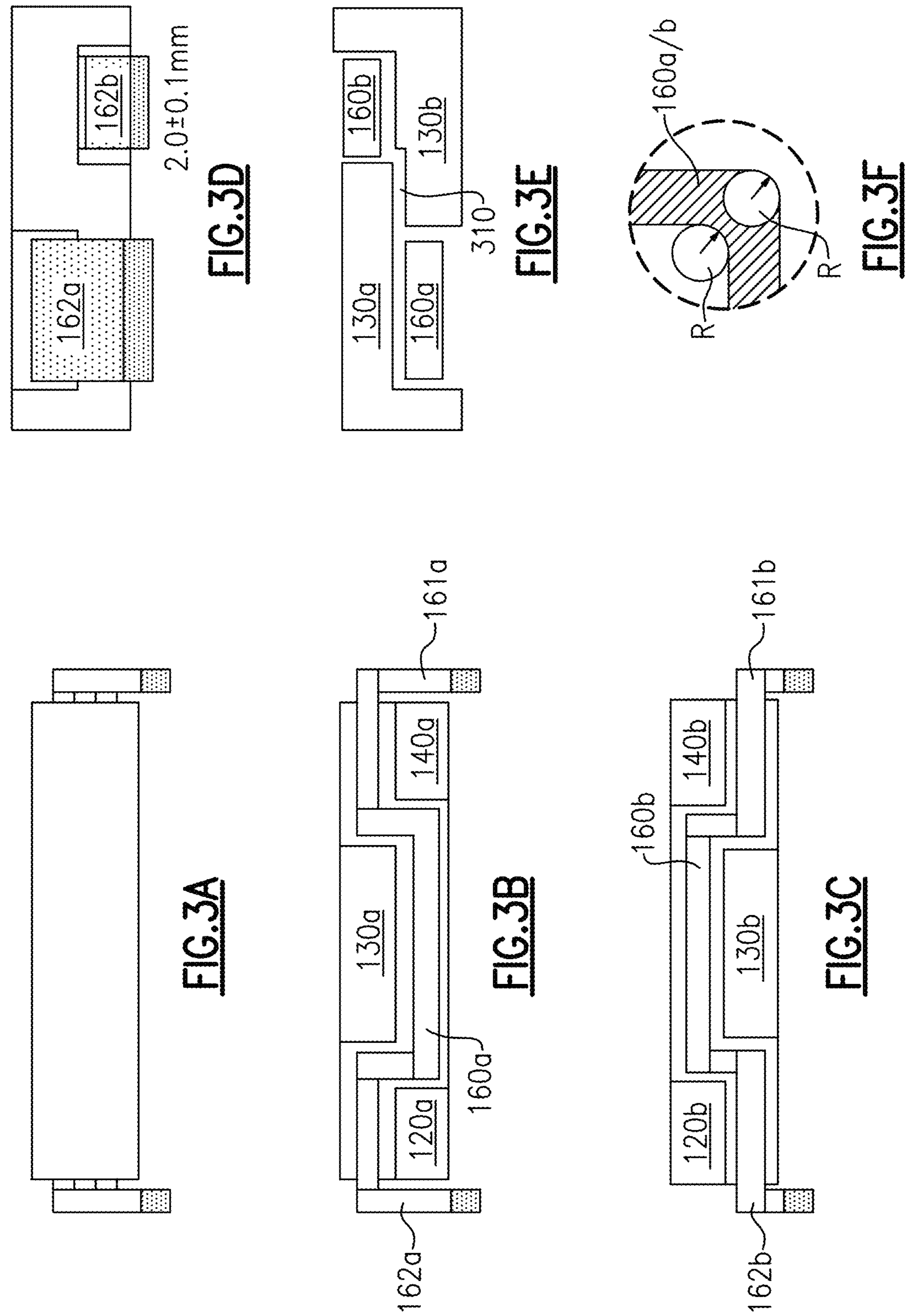
FIG. 3A is an elevational view of the low-profile coupled inductor of FIG. 1.
FIG. 3B is an elevational cross-sectional view of a first core of the low-profile coupled inductor.
FIG. 3C is an elevational cross-sectional view of a second core of the low-profile coupled inductor.
FIG. 3D is an elevational view of an end of the low-profile coupled inductor.
FIG. 3E is an annotated cross-section of the low-profile coupled inductor of FIG. 1 taken along the lines 3E-3E.
FIG. 3F is a cross section of a corner of a conducting strip.

Referring now to FIGS. 3A through 3E, various elevational views and cross-sectional views of the inductor 100 and cores 110*a/b* are shown. In FIG. 3A, a side of one embodiment of the inductor 100 is shown. In FIGS. 3B and 3C, cross sections of the first core 110*a* and the second core 110*b* of the inductor of FIG. 3A are provided. FIGS. 3B and 3C illustrate the alternating paths of the conducting strips 160*a/b* through either serpentine channel 150*a/b*.

In FIG. 3D, an end of the inductor of FIG. 3A is shown, illustrating the complementary end portions of the projections 120*a/b* and the two input terminals 161*a/b*. FIG. 3E shows a cross section of the inductor 100 of FIG. 3D taken from a midpoint of the inductor.

To greatly improve energy transfer between adjacent magnetic fields in the coupled inductor 100, a "core gap" 310 is provided in at least one end portion of one of the core projections 120*a*-140*b*. In the preferred embodiment of FIG. 3E, the core gap 310 is present on the second projection

130*b* of the second core 110*b*. In the preferred embodiment, the core gap 310 is a cavity in the end portion of the projection 130*b* having a depth of approximately 0.03 millimeters and length of approximately 2.2 millimeters that separates the projection 130*b* from its complementary projection 130*a*. In various embodiments, the coupled inductor 100 can include a plurality of core gaps in any of the cores or core projections. The core gap 310 can be a substantially empty cavity, or it can be filled with a non-ferrous material (such as, an adhesive).

In certain embodiments, a corner radius R is provided at one or more edges of the cores 110*a/b* or conducting strips 160*a/b*, as shown in FIG. 3F. The corner radius improves ease of manufacture, particularly for conducting strips 160*a/b* as will be discussed herein.

Figure 4B:
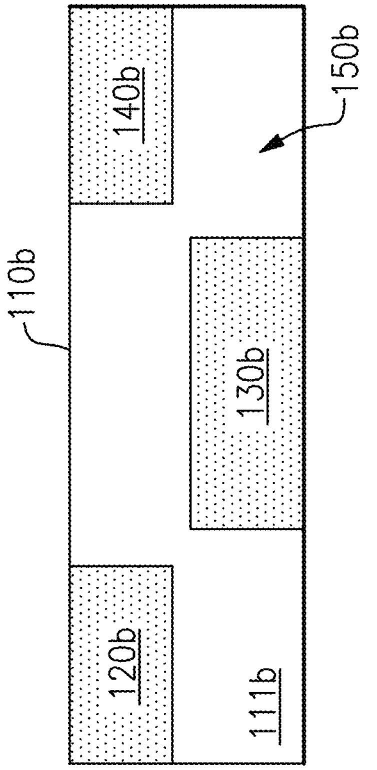
FIG. 4B is an annotated cross-section of the first core of the low-profile coupled inductor of FIG. 1 taken along the lines 4B-4B.
Figure 4A:
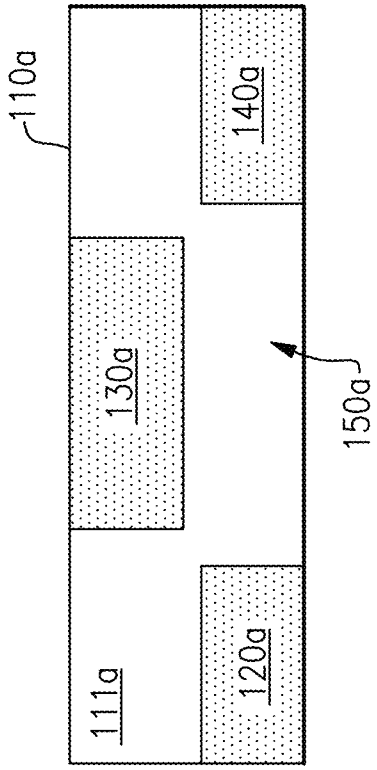
FIG. 4A is an annotated cross-section of the first core of the low-profile coupled inductor of FIG. 1 taken along the lines 4A-4A.

As shown in FIGS. 3A 4A, and 4B, the inductor 100 has a low rectangular profile for easier integration in compact printed circuit board (PCB) layouts. The relative positions of the first core projections 120*a*, 130*a*, and 140*a* are illustrated in FIG. 4A against the inner surface 111*a*. The relative positions of the second core projections 120*b*, 130*b*, and 140*b* are illustrated in FIG. 4B against the inner surface 111*b*. FIGS. 4A and 4B together illustrate how the complementary end portions of the first core 110*a* and the second core 110*b* mesh together to form the substantially rectangular inductor of FIGS. 1-3E. The internal structure of the inductor 100, including the core gap 310, provides the inductor with a high magnetic coupling coefficient (K-factor), high operating efficiency, and an improved transient load response.

A PCB designer can also route inductor windings similarly to a non-coupled inductor (such as, clockwise or counterclockwise) because of the same-side input terminals 161*a/b* and output terminals 162*a/b*. In the preferred embodiment, the inductor 100 has an inductance of approximately 300 nanohenries and a leakage inductance of approximately 70 nanohenries.

Manufacturing the Inductor

To assemble a low profile coupled inductor 100 according to the present invention, the first core 110*a* and second core 110*b* are first provided. The first conducting strip 160*a* is prepared and inserted into the serpentine channel 150*a* of the first core 110*a*, and the second conducting strip 160*b* is prepared and inserted into the serpentine channel 150*b* of the second core 110*b*. In certain embodiments, an adhesive or resin is applied to the conducting strips 160*a/b* or cores 110*a/b* to fix the conducting strips in place within the serpentine channels. The first core 110*a* and second core 110*b* are then fixed together, such as with an adhesive applied to the complementary end portions of the projections 120*a*-140*b*.

The method of preparing and inserting the conducting strips 160*a/b* depends on the stiffness and elastic modulus of the conducting strips. For example, a sufficiently flexible conducting strip 160*a/b* can be woven through each of the serpentine channels from one side of the inductor, which advantageously allows the conducting strips to be inserted or replaced after the inductor 100 is assembled.

Each conducting strip 160*a/b* is formed (such as, by bending or stamping) from a continuous metal strip to match the profile of the serpentine channel 150*a/b* and then inserted flush along the inner surface 111*a/b* of the core 110*a/b*. The conducting strips 160*a/b* can fill nearly the whole volume of the serpentine channels 150*a/b* to increase the current-carrying capacity and magnetic field strength of the inductor 100. Each of the conducting strips can be formed to certain specifications of thickness (such as, approximately 2.2 millimeters), depth (such as, approximately 2.0 to 2.5 millimeters), and width depending on the internal volume of each serpentine channel as formed by the plurality of projections 120-140. In certain embodiments, one or more of the plurality of projections can have a thickness of approximately 4.5 millimeters and a depth of approximately 6 millimeters. However, it will be understood by those skilled in the art that the dimensions of the serpentine channels 150*a/b* and corresponding conducting strips 160*a/b* can vary significantly. A designer may select larger or smaller conducting strips to balance performance requirements of the inductor 100 with size constraints, materials properties, and other limiting factors.

In the preferred embodiment, at least 80% of the volume of each serpentine channel 150*a/b* is occupied by a conducting strip 160*a/b*. In other embodiments, upward of 90% or 95% of the volume of the serpentine channels 150*a/b* may be filled by the conducting strips 160*a/b*. In the continuous metal strip embodiment, the corner radius R of FIG. 3F can be selected based on the capabilities of the equipment used and the materials properties of the metal strip (such as, a minimum bending radius).

In certain embodiments, the conducting strips 160*a/b* can be formed from several segments of a metal strip pre-cut to size, where the segments are joined by welding, brazing, soldering, or any other method known to one skilled in the art.

The opposing serpentine profiles of the channels 150*a/b* cause the conducting strips 160*a/b* to alternate in elevation. As electric current(s) passes through the conducting strips 160*a/b*, the conducting strips each emit a magnetic field. The positioning of the conductors 160*a/b* in substantially separate planes and the presence of one or more core gaps 310 between the cores 110*a/b* creates a strong magnetic flux coupling with improved energy transfer and power density in a low-profile and compact package.

Applications

Devices employing the above-described schemes can be implemented into various electronic devices and multimedia communication systems. Examples of the electronic devices can include, but are not limited to, consumer electronic products, parts of the consumer electronic products, electronic test equipment, communication infrastructure applications, etc. Further, the electronic device can include unfinished products, including those for communication, industrial, medical and automotive applications.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. For example, the actual steps and/or order of steps taken in the disclosed processes may differ from those shown in the figure. Depending on the embodiment, certain of the steps described above may be removed, others may be added. Furthermore, the features and attributes of the specific embodiments disclosed above may be combined in different ways to form additional embodiments, all of which fall within the scope of the present disclosure.

Conditional language used herein, such as, among others, "can," "could", "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language, such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:

1. A low-profile coupled inductor, comprising:

a first core having a first inner surface, a first plurality of projections connected to the first inner surface, and a serpentine channel on the first inner surface formed by the first plurality of projections, wherein the first plurality of projections comprises a first projection, a second projection, and a third projection, wherein the second projection is between the first and the third projections, wherein the first and the third projections are disposed at a first elevation along the first inner surface, and wherein the second projection is disposed at a second elevation along the first inner surface, the second elevation different than the first elevation;

a second core having a second inner surface and a serpentine channel on the second inner surface formed by a second plurality of projections; and first and second conducting strips, each of the first and second conducting strips having an inlet port and an outlet port, wherein the first conducting strip extends along the serpentine channel of the first core and the second conducting strip extends along the serpentine channel of the second core.

2. The inductor of claim 1, wherein the first conducting strip is disposed between the first plurality of projections and the second conducting strip is disposed between the second plurality of projections such that at least a portion of the first conducting strip that extends parallel to the second conducting strip is not coplanar with the second conducting strip.

3. The inductor of claim 1, wherein the first core and second core are constructed of a ferrite material.

4. The inductor of claim 1, wherein the first and second cores are coupled together by way of the projections such that both conducting strips are positioned between the cores.

5. The inductor of claim 4, wherein a discontinuity in an exterior surface of one or more of the projections forms a gap approximately at a midpoint between the first and second cores.

6. The inductor of claim 5, wherein the gap is filled with an adhesive or resin to mechanically connect one of the projections of the first plurality with one of the projections of the second plurality.

7. The inductor of claim 1, wherein one of the projections of the first plurality and one of the projections of the second plurality are connected with an adhesive or resin.

8. The inductor of claim 1, wherein each of the first and second conducting strips are at least 20% copper.

9. The inductor of claim 1, wherein the first of the conducting strips has a depth of approximately 2.45 millimeters and the second of the conducting strips has a depth of approximately 2.0 millimeters.

10. The inductor of claim 1, wherein the first and second cores are connected together such that the inlet ports are adjacent and the outlet ports are adjacent.

11. The inductor of claim 1, wherein at least one of the first or second plurality of projections has a thickness of approximately 4.5 millimeters and a depth of approximately 6 millimeters, and wherein at least one of the first or second conducting strips has a thickness of approximately 2.2 millimeters.

12. The inductor of claim 5, wherein the gap has a thickness of approximately 0.03 millimeters and a width of approximately 2.2 millimeters.

13. The inductor of claim 1, having an inductance of about 300 nanohenries.

14. The inductor of claim 1, having a leakage inductance of about 70 nanohenries.

15. A low-profile coupled inductor, comprising:

a first ferrite core comprising a first plurality of projections, wherein the first plurality of projections comprises a first projection, a second projection, and a third projection, wherein the second projection is between the first and the third projections, wherein the first and the third projections are substantially level with a lower surface of the first ferrite core, and wherein the second projection is substantially level with an upper surface of the first ferrite core;

a second ferrite core comprising a second plurality of projections; and a first and a second conducting strip, each of the conducting strips having an inlet port and an outlet port;

wherein the first conducting strip is disposed between the first plurality of projections and the second conducting strip is disposed between the second plurality of projections, wherein at least a portion of the first conducting strip extends parallel to the second conducting strip and is not coplanar with the second conducting strip.

16. The inductor of claim 15, wherein the first and second conducting strips are configured such that both of the inlet ports of the first and second conducting strips are adjacent and both of the outlet ports of the first and second conducting strips are adjacent.

* * * * *